July 4, 1967  L. A. IDDINGS  3,328,881
RAPID INERTIAL ALIGNMENT METHOD
Filed Feb. 27, 1964  6 Sheets-Sheet 2
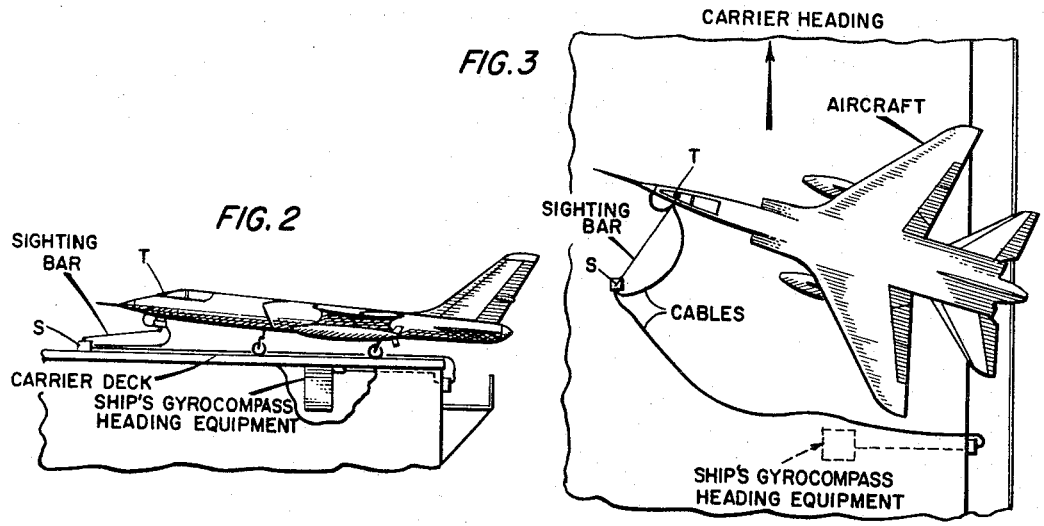
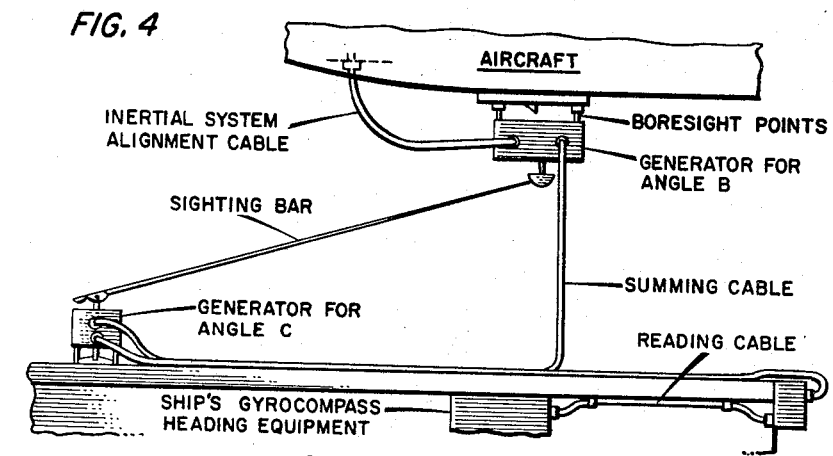
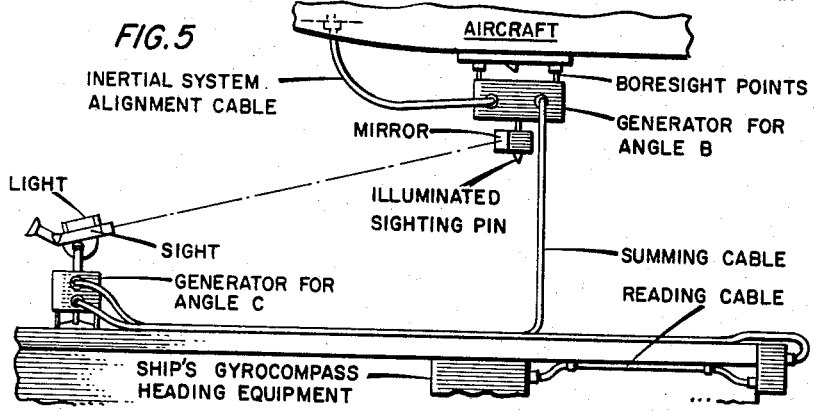

$\phi = A + B + C - 180°$
$\phi = 36° + 50° + 64° - 180°$
$\phi = -30°$
$\phi = 330°$

ANGLE A = 36°
" C = 64°
" B = 50°
" A' = 216°

$\phi' = A' + B + C - 180°$
$\phi' = 216° + 50° + 64° - 180°$
$\phi' = 150°$ $\phi = A + B + C - 180°$
$\phi = 292° + 45° + 331° - 180°$
$\phi = 588°$
$\phi = 228$

ANGLE A = 292°
" C = 145°
" B = 331°
" A' = 112°

$\phi' = A' + B + C - 180°$
$\phi' = 112° + 331° + 145° - 180°$
$\phi' = 408°$
$\phi' = 48°$

United States Patent Office 3,328,881
Patented July 4, 1967

3,328,881
RAPID INERTIAL ALIGNMENT METHOD
Lloyd A. Iddings, Arlington, Va., assignor to the United States of America as represented by the Secretary of the Navy
Filed Feb. 27, 1964, Ser. No. 347,961
5 Claims. (Cl. 33—1)

ABSTRACT OF THE DISCLOSURE

A method of aligning a carrier based aircraft inertial system with respect to true north by summing three angles and subtracting therefrom 180° wherein the first angle is the carrier heading angle with respect to true north, the second angle is the clockwise angle formed by the longitudinal axis of the aircraft and a line intersecting an arbitrary point on the carrier deck and an arbitrary point on the longitudinal axis of the aircraft and the third angle is the clockwise angle formed by the carrier heading and the line formed by the intersection of the arbitrary point on the carrier deck and the arbitrary point on the longitudinal axis of the aircraft.

---

The invention described herein may be manufactured and used by or for the Government of the United States of America for governmental purposes without the payment of any royalties thereon or therefor.

This invention relates to a method for aligning the inertial system in aircraft and more particularly to a method for determining the heading of an aircraft on an aircraft carrier for the purpose of calibrating the aircraft heading instruments.

The inertial system equipment on carrier based high performance aircraft requires calibration regularly so that during flight the pilot may depend upon the accuracy of the heading indications of the system. The present method of calibration is to align the system by means of gyrocompassing. This method necessitates a large piece of equipment aboard ship to furnish parameters to the aircraft equipment and a sizable computer for each aircraft. The time required to calibrate the inertial system for each aircraft utilizing the gyrocompassing alignment method is from 15 to 35 minutes. The gyrocompassing alignment method also requires the attention of several people in its performance.

There is therefore a need for a fast and accurate method of establishing carrier based aircraft headings which is used to calibrate the aircraft heading equipment. There is a need for a method which is simply performed by one individual. The instant invention provides a method meeting these requirements and which is compatible with the operating environment aboard an aircraft carrier.

The present invention provides a method of aligning a carrier based aircraft inertial system without the need of large and expensive computers aboard the aircraft carrier and the aircraft respectively and which deals only in angular relationships to eliminate the correlation of other parameters such as velocity. The time required to align the aircraft inertial system utilizing the method set forth by this invention from 30 seconds to 4 minutes. The method of the present invention produces the desired accuracy and reduces the cost and complexity as compared to presently utilized methods by a factor between 70 and 80 percent.

It is therefore an object of the present invention to provide a method of rapidly and accurately establishing the heading of a carrier based aircraft.

Another object of the present invention is to provide a method which is simple and capable of being performed by one person to determine the aircraft heading of an aircraft based on an aircraft carrier.

A further object of the present invention is to provide a method of ascertaining an aircraft heading to calibrate the inertial system of the aircraft which has the foregoing objects and is compatible with the operating environment aboard an aircraft carrier.

A still further object of the instant invention is to provide a method of calibrating the inertial system of a carrier based aircraft which method utilizes only angular relationships.

Other objects and many of the attendant advantages of this invention will be readily appreciated as the same becomes better understood by reference to the following detailed description when considered in connection with the accompanying drawings wherein:

FIG. 2 is a side elevational view of an aircraft on the aircraft carrier deck;

FIG. 3 is a plan view of the aircraft illustrated in FIG. 2;

FIG. 4 is an illustrative view showing equipment disposed on the aircraft carrier and on the aircraft for determining the angular relationships between the aircraft and the aircraft carrier;

FIG. 5 is an illustrative view showing alternative equipment utilized to determine the angular relationship between the aircraft and the aircraft carrier;

Figure 1:
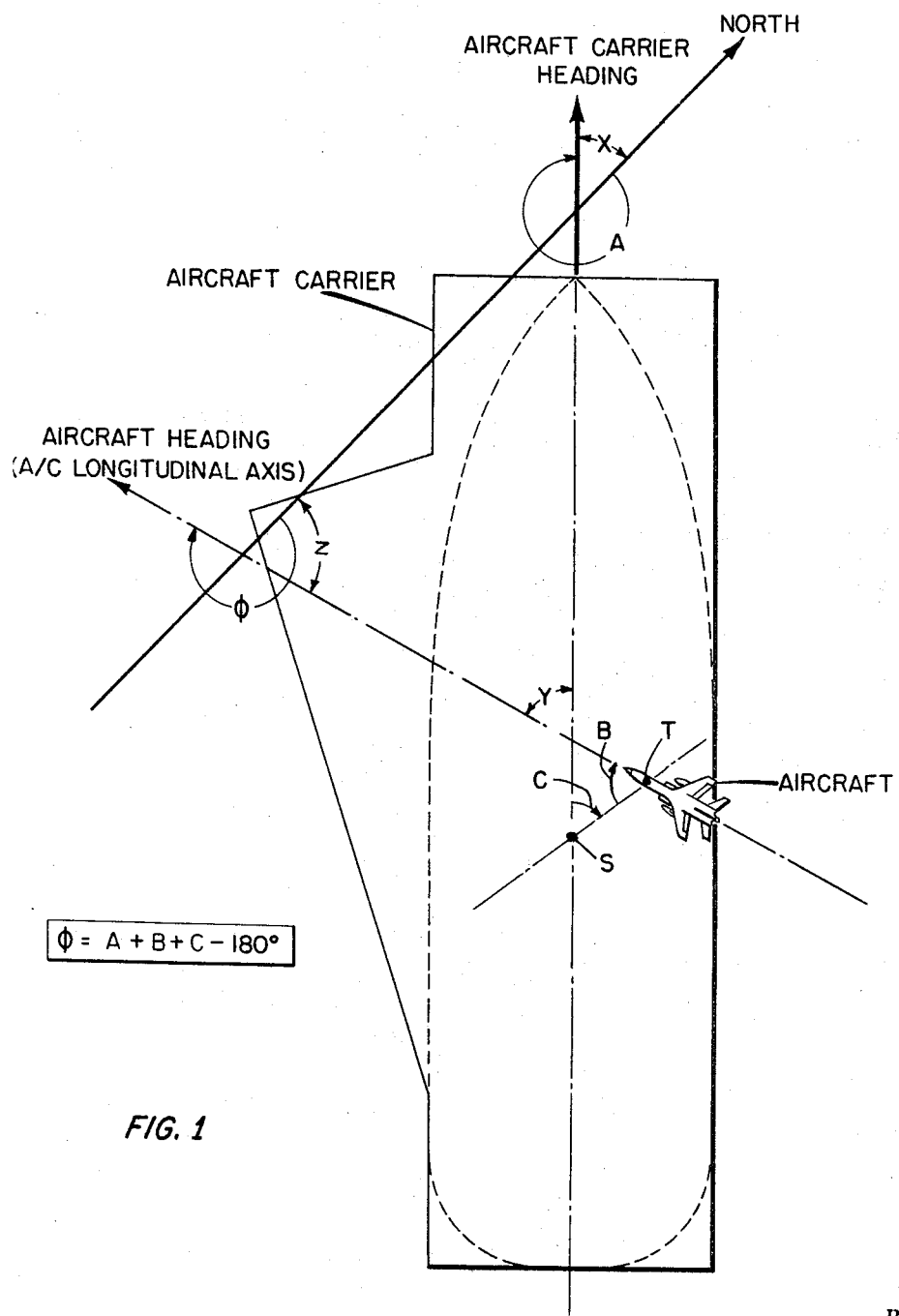
FIG. 1 is a plan view of an aircraft carrier with an aircraft situated on the flight deck with true north, the aircraft carrier heading, and the longitudinal axis of the aircraft indicated.

Referring now to the drawings there is shown in FIG. 1 a plan view of an aircraft carrier with an aircraft on the flight deck. The angles shown in FIG. 1 are those angles necessary to determine an angular relationship whereby the heading of the aircraft may be determined. Angle A is the carrier heading and is indicated on the compass equipment of the aircraft carrier. Angle C is the clockwise angle between the heading of the aircraft carrier and a line extending from a point S on the deck of the carrier to a point T on the longitudinal axis of the aircraft. Point S is any convenient place on the aircraft carrier flight deck which is available for situating a small piece of equipment which is utilized to carry out this method. Angle B is the clockwise angle between the line intersecting point S on the flight deck and point T on the longitudinal axis of the aircraft and the longitudinal axis of the aircraft. Angle $\phi$ is the desired angle and represents the heading of the aircraft.

As illustrated in FIG. 1 the north-south meridian forms a triangle with the longitudinal axis of the aircraft and the aircraft carrier heading. This triangle has three interior angles X, Y and Z; X being the angle between the north-south meridian and the aircraft carrier heading, Y being the angle between the longitudinal axis of aircraft and the aircraft carrier heading, and Z being the angle between the north-south meridian and longitudinal axis of the aircraft.

In the performance of this method of alignment a point S is selected on the flight deck of the carrier and a given point T on the longitudinal axis of an aircraft is sighted, or any straight line of an imaginary nature is established between points S and T. FIG. 2 shows an elevational view of an aircraft on the flight deck showing points S and T with a signal being sent by cable to a point S on the flight deck from the ship's gyrocompass heading equipment. FIG. 3 is a plan view of the aircraft illustrated in FIG. 2 and shows an angle generator at point S utilizing a sighting bar to establish a line between points S and T.

FIG. 4 is a diagrammatic view illustrating one of the many species of equipment which may be utilized for establishing angles B and C. At point S there is a generator for the angle C. There is also a generator for angle B disposed on the aircraft at point T. An electrical signal indicating the ship's heading is sent through the reading cable to the angle C generator. The generator for angle C produces an electrical signal corresponding to the angle C which is correlated with the signal from the ship's heading equipment and sent by a summing cable to the angle B generator where it is correlated with the value determined by the generator for angle B and sent through the initial system alignment cable to the inertial system of the aircraft. The generators for angle C and angle B may be of various types; for example, synchromotors, rheostats or any other similar analog device. It is also possible that separate signals may be sent from the ship's heading equipment, from the angle C generator and from the angle B generator to a small computer attached to the aircraft at point T which correlates the signals to compute the aircraft heading. FIG. 4 shows a sighting bar, which is but a mere rod, utilized to establish a straight line between the angle C generator and the angle B generator. FIG. 5 is a diagrammatic view similar to FIG. 4 differing only in the means by which the imaginary line between points S and T is established. In FIG. 5 a light is used at point S and sighted at a mirror at point T. By aligning the light with the mirror a straight line is established between point S and point T. Besides the rod or the light and mirror devices many other various devices may be utilized to establish the imaginary line between points S and T. There are numerous optical devices which might be used for such a purpose.

Referring again to FIG. 1 and in light of the foregoing it is evident that the angles utilized to determine the heading of the aircraft are the angle A, which is the aircraft carrier heading, the angle C, and the angle B. The relationship between angles A, B and C to obtain angle $\phi$ is obtained as follows:

$X = 360 - A$
$Y = 180 - C - B$
$Z = 180 - X - Y$
$\phi = Z + 180$ substituting in the equation $Z = 180 - X - Y$ for X and Y:

$$Z = A + C + B - 360$$

and $$Z = \phi - 180$$

therefore $$\phi = A + C + B - 180$$

Figure 6:
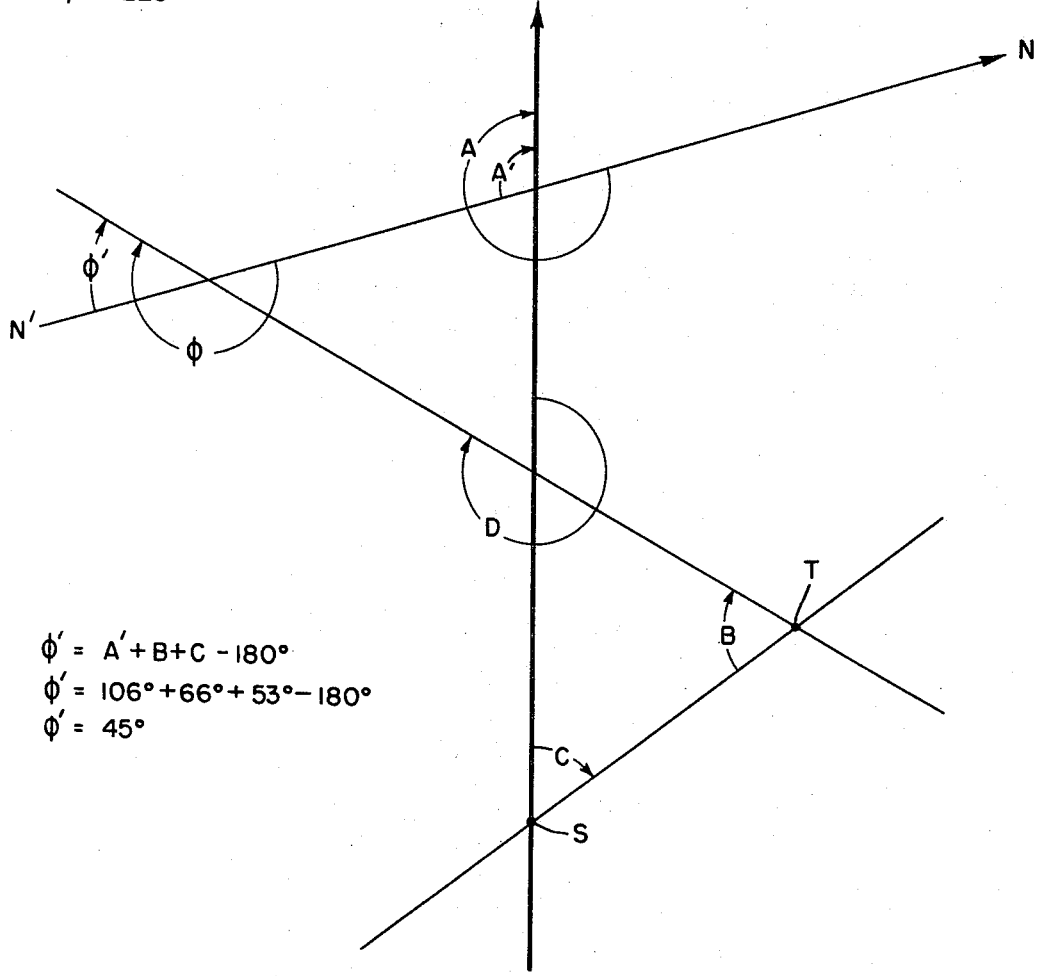
FIG. 6 is a geometrical view illustrating the disposition of true north, the aircraft heading, and the aircraft carrier heading as illustrated in FIG. 1.
Figure 7:
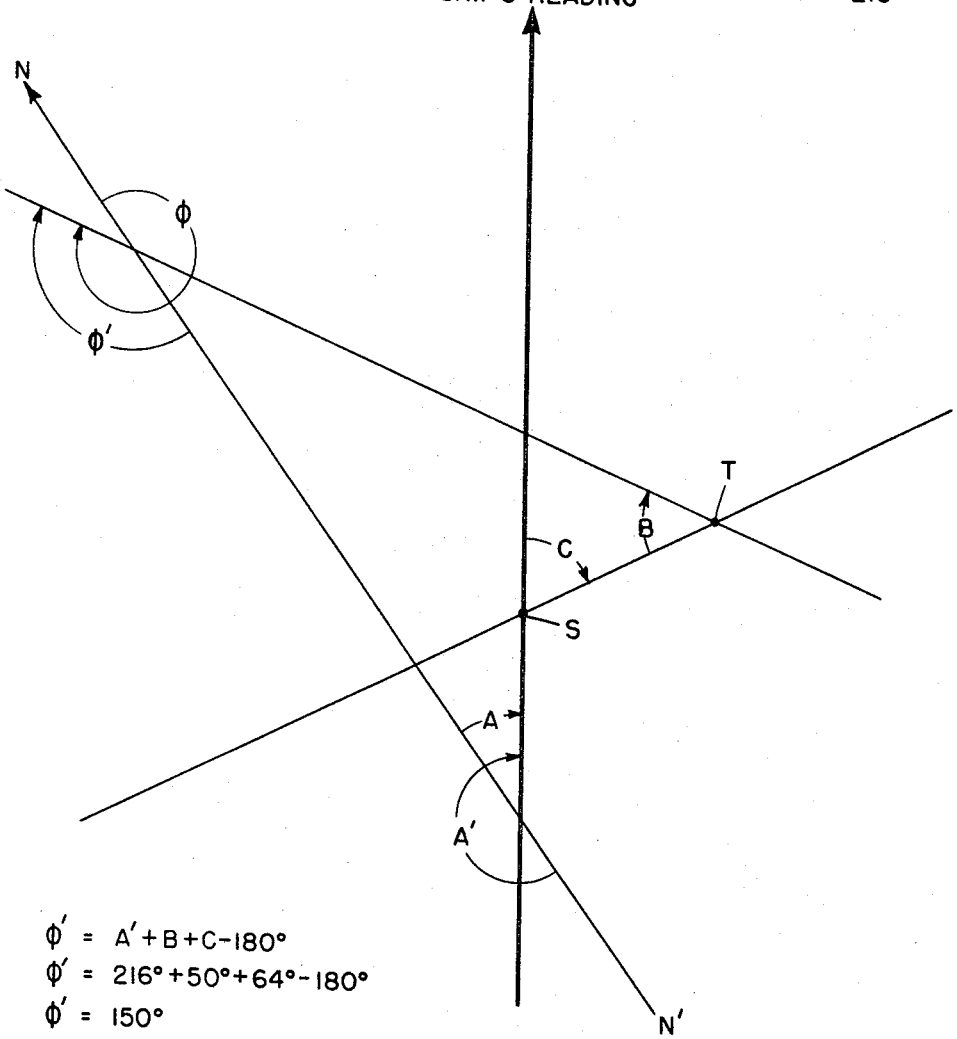
FIG. 7 is a geometrical view showing the relative disposition of the aircraft with respect to the aircraft carrier as shown in FIG. 1 but with a different relative disposition of the true north meridian.

FIGS. 6 through 9 show various angular relationships with the longitudinal axis of the aircraft disposed at a clockwise angle with respect to the heading of the aircraft carrier which is between 180 and 360 degrees, as illustrated by angle D in FIG. 6. In FIG. 6 N represents the true north, A represents the heading of the aircraft carrier, B represents the angle between the axis of the aircraft and a line connecting points S and T, and $\phi$ represents the heading of the aircraft. By utilizing the formula $\phi = A + B + C - 180$ angle $\phi$ is 225 degrees. In FIG. 6, as in FIGS. 7 and 9, N' represents true north in a situation where the ship's heading is 180 degrees different from the ship's heading where N represents true north. When N' represents true north A' represents the heading of the aircraft carrier and $\phi'$ represents the aircraft heading. Utilizing the same basic formula $\phi' = A' + B + C - 180$, $\phi'$ equals 45 degrees. FIG. 7 is similar to FIG. 6 with the exception that the north and south meridian is disposed with a different angular relationship with respect to the aircraft carrier heading, i.e., the carrier is heading in another direction. When true north is in the direction of N, A represents the aircraft carrier heading and $\phi$ the aircraft heading; and as is shown in FIG. 7, $\phi$ is 330 degrees. It is noted that by utilizing the formula $$\phi = A + B + C - 180$$

for determining $\phi$ as represented in FIG. 7 the resultant value is a negative or a minus 30 degrees. As is well known, any heading lies between zero and a clockwise 360 degrees, the reference being zero. Therefore, a minus 30 degrees is a counterclockwise movement from zero which results in a heading of 330 degrees. When true north lies in the direction of N' as illustrated in FIG. 7, $\phi'$, the aircraft heading, is 150 degrees.

Figure 8:
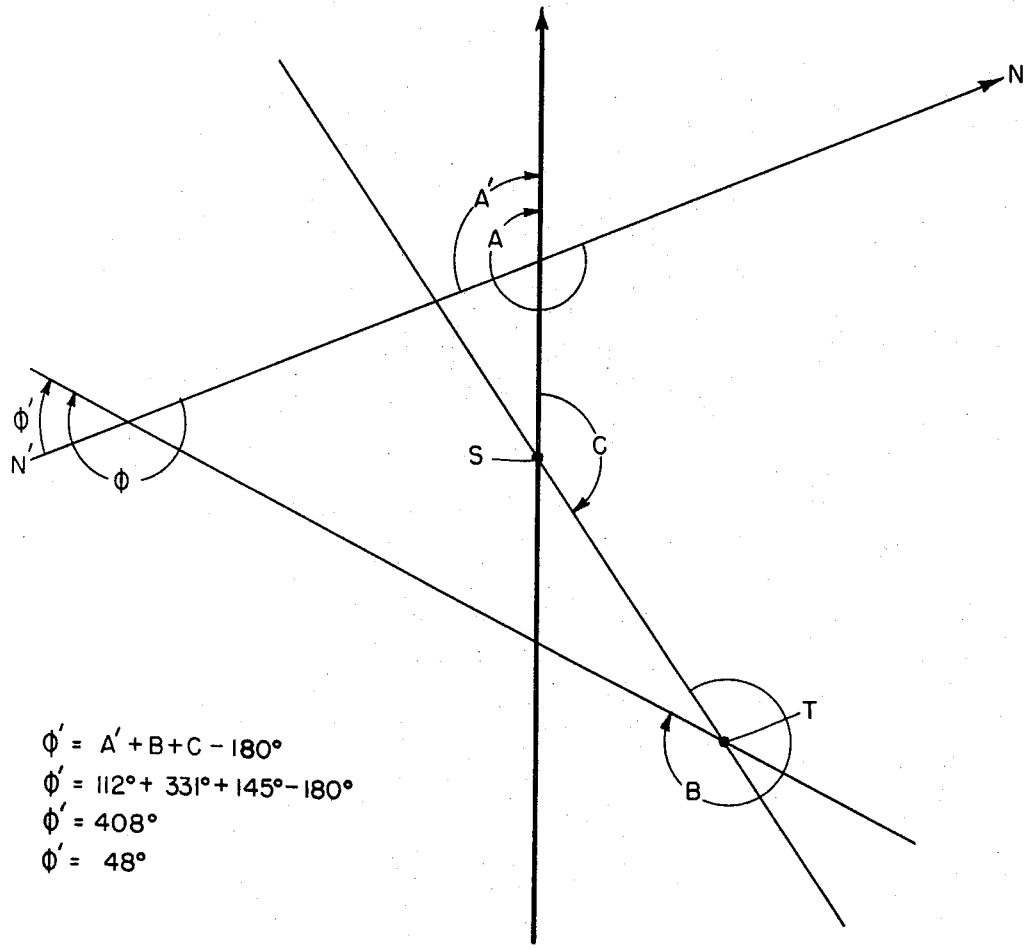
FIG. 8 is a geometrical view showing the relative disposition of the aircraft, true north, and the aircraft carrier heading, as illustrated in FIG. 1 but with the alignment equipment being disposed on the right hand side of the aircraft.

FIG. 8 shows the same approximate angular relationship between the north-south line, the longitudinal axis of the aircraft, and the aircraft heading as is illustrated in FIG. 6; however, the point S, upon which equipment is positioned to establish a line between the point S and the point T on the aircraft, is on the right side of longitudinal axis of the aircraft. When true north lies in the direction as represented by N in FIG. 8, $\phi$ is determined to be 588 degrees by the equation and as hereinbefore stated the heading must lie between zero and 360 degrees, therefore, the heading represented by 588 degrees is 228 degrees. Likewise when true north lies in the direction represented by N', as shown in FIG. 8, $\phi'$ results in an angle 408 degrees and this represents a heading of 48 degrees.

Figure 9:
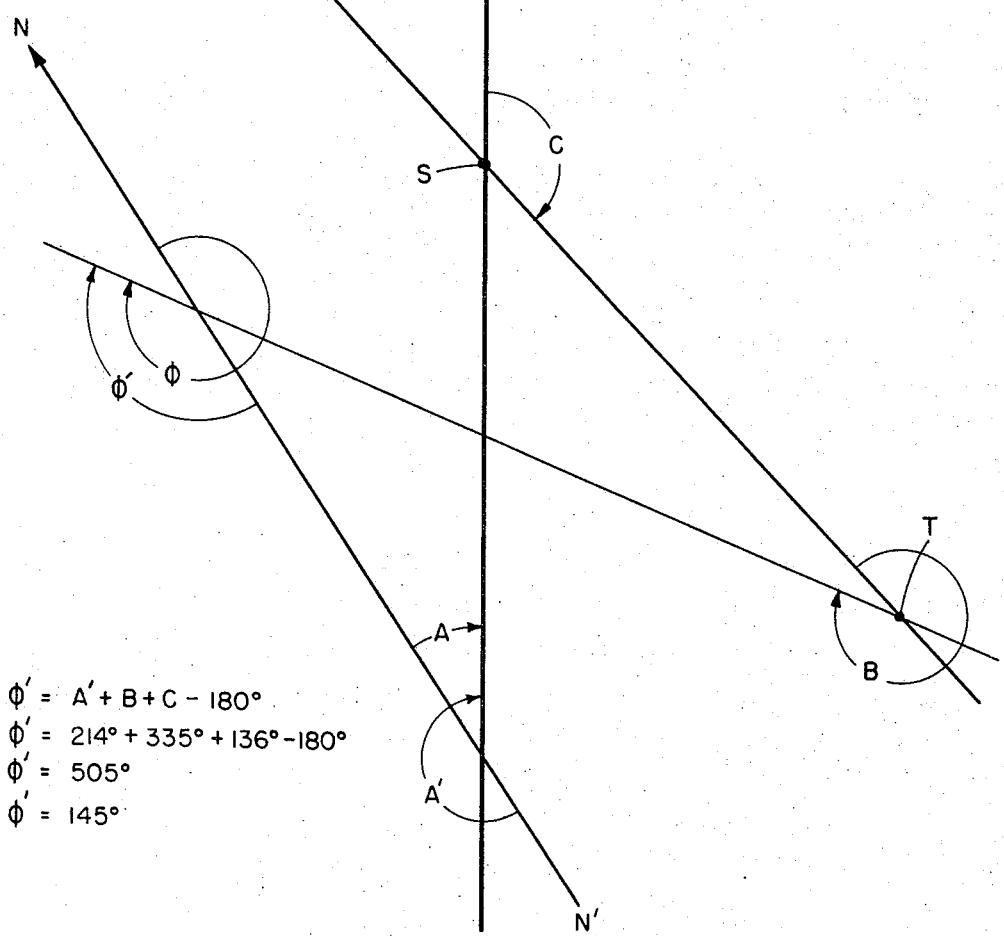
FIG. 9 is a geometrical view of the arrangement shown in FIG. 8 but with a different disposition of the true north meridian.

FIG. 9 shows the situation where point S is on the right hand side of the longitudinal axis of the aircraft and a different disposition of true north meridian than was illustrated in FIG. 8. When true north is in a direction as indicated by N, $\phi$ equals an angle of 325 degrees, and when true north lies in a direction as represented by N', $\phi'$ equals an angle of 505 degrees, which is a heading of 145 degrees.

The situations represented in FIGS. 1 and 6 through 9 are those in which the aircraft is disposed in a clockwise angular relationship with the aircraft carrier heading which is between 180 and 360 degrees. It is also possible to use this method when the angular relationship between the aircraft carrier and the heading of the aircraft is a clockwise angle between zero and 180 degrees; in other words, when the aircraft is headed in the opposite direction from that direction depicted in FIGS. 1 and 6 through 9. When the aircraft is disposed in this relationship with the aircraft carrier the equation to determine the aircraft heading is determined to be $\phi = A + B + C$.

As is apparent from the foregoing description, the present invention provides a unique method of determining an aircraft heading on an aircraft carrier to calibrate the inertial system by utilization of angular relationships which are readily determinable on the aircraft carrier.

The invention has been described in an illustrative manner and it is to be understood that the terminology which has been used herein is intended to be in the nature of words of description rather than of limitation.

Obviously many modifications and variations of the present invention are possible in light of the above teachings. It is therefore to be understood that within the scope of the appended claims the invention may be practiced otherwise than as specifically described.

What is claimed is:

1. A method for alignment of the airborne inertial system of an aircraft which is on an aircraft carrier comprising the steps;

measuring the aircraft carrier heading,
establishing a first point on the aircraft carrier,
establishing a second point on the aircraft,
establishing a straight line between said first point and said second point,
measuring a first angular relationship between the aircraft carrier heading and said straight line, and
measuring a second angular relationship between the longitudinal axis of the aircraft and said straight line for determining from said aircraft carrier heading, said first angular relationship and said second angular relationship the aircraft heading.

2. In a method for automatic alignment of aircraft equipment to establish aircraft heading prior to launch from an aircraft carrier comprising the steps;
measuring the heading of the aircraft carrier,
establishing a straight line between a point on the aircraft carrier and a point on the aircraft,
determining a first angle between the aircraft carrier heading and said straight line by moving from the aircraft carrier heading in a clockwise direction to said straight line,
ascertaining a second angle between the direction in which the aircraft is aligned and said straight line by moving from said straight line in a clockwise direction to the direction in which the aircraft is headed, and
utilizing a computer to sum the aircraft carrier heading, said first angle, said second angle and a constant thereby to produce the aircraft heading.

3. A method for alignment of the airborne inertial system in an aircraft on an aircraft carrier comprising the steps;
establishing a first point on the aircraft carrier,
establishing a second point on the aircraft,
establishing a straight line between said first point and said second point,
determining a first angle by measuring clockwise from the aircraft carrier heading to said straight line,
determining a second angle by measuring clockwise from said straight line as it leads from said second point on said aircraft to said first point on said aircraft carrier to a line heading in the direction of the direction of the aircraft, and
utilizing a computer to sum the aircraft carrier heading, said first angle, said second angle and a constant factor to deliver the correct aircraft heading to the aircraft airborne inertial system.

4. The method of determining the heading of an aircraft carrier based aircraft comprising the steps;
aligning the aircraft in a direction whereby the angle measured in a clockwise direction between the aircraft carrier heading and the aircraft is between 180° and 360°,
establishing a first point on the aircraft carrier,
establishing a second point on the longitudinal axis of said aircraft,
measuring in a clockwise direction a first angle between the aircraft carrier heading and a line leading from said first point to said second point,
measuring in a clockwise direction a second angle between a line leading from said second point to said first point and a line in the direction of the aircraft, and
utilizing a computer to sum the aircraft carrier heading, said first angle, said second angle and a negative 180° to obtain the aircraft heading.

5. The method of determining the heading of an aircraft carrier based aircraft comprising the steps;
aligning the aircraft in a direction whereby the angle measured in a clockwise direction between the aircraft carrier heading and the aircraft is between 0° and 180°,
establishing a first point on the aircraft carrier,
establishing a second point on the longitudinal axis of said aircraft,
measuring in a clockwise direction a first angle between the aircraft carrier heading and a line leading from said first point to said second point,
measuring in a clockwise direction a second angle between a line leading from said second point to said first point and a line in the direction of the aircraft, and
utilizing a computer to sum the aircraft carrier heading, said first angle and said second angle to obtain the heading of the aircraft.

References Cited

UNITED STATES PATENTS

| | | | |
|---|---|---|---|
| 2,748,486 | 6/1956 | Lord et al. | 33—46.2 |
| 3,119,189 | 1/1964 | Hyne | 33—222 |

OTHER REFERENCES

Ingram, E. L.: Geodetic Surveying, N.Y., McGraw-Hill, 1911, p. 75–78.

LEONARD FORMAN, *Primary Examiner.*

W. D. MARTIN, *Assistant Examiner.*